UNITED STATES PATENT OFFICE.

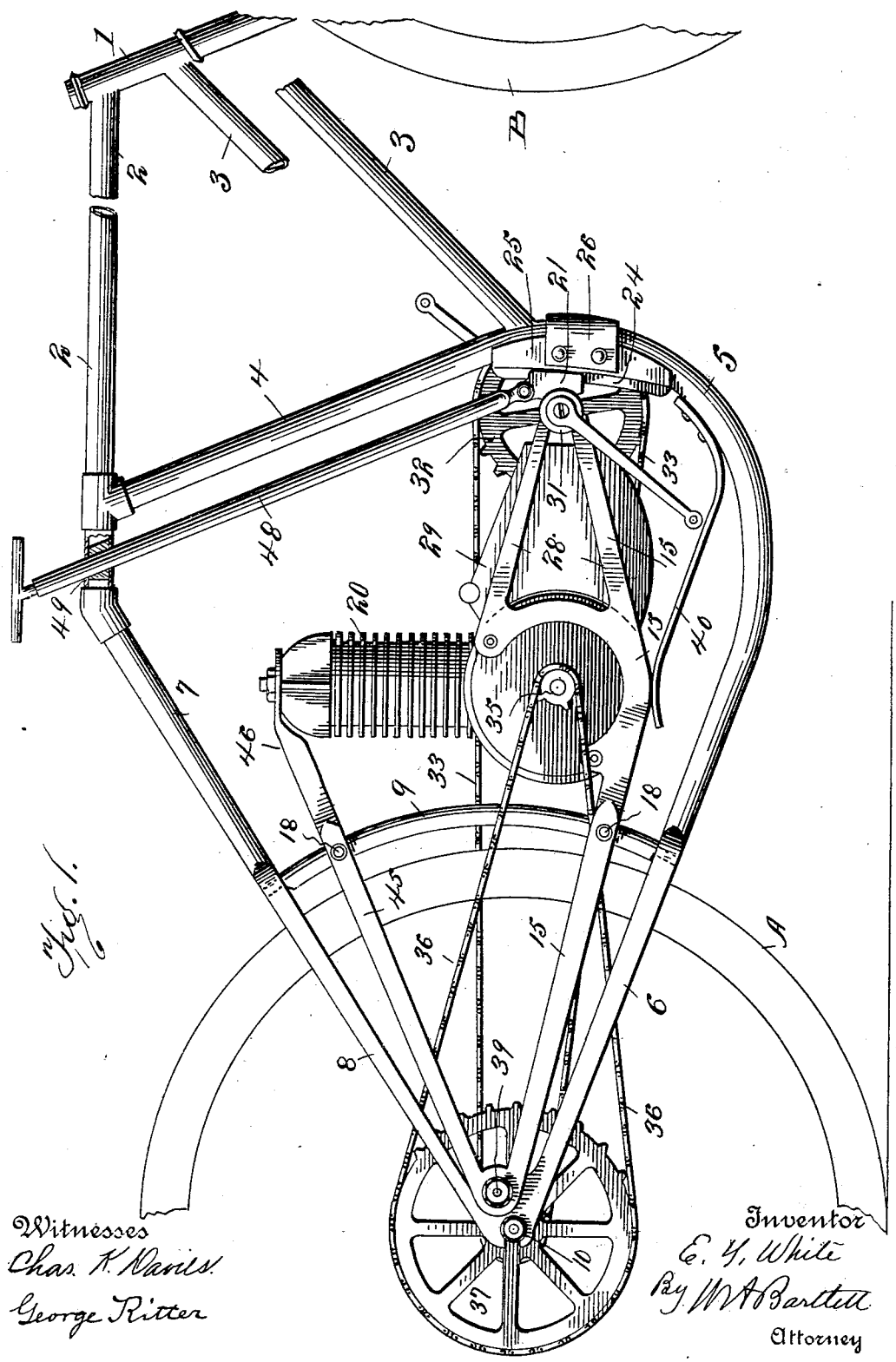

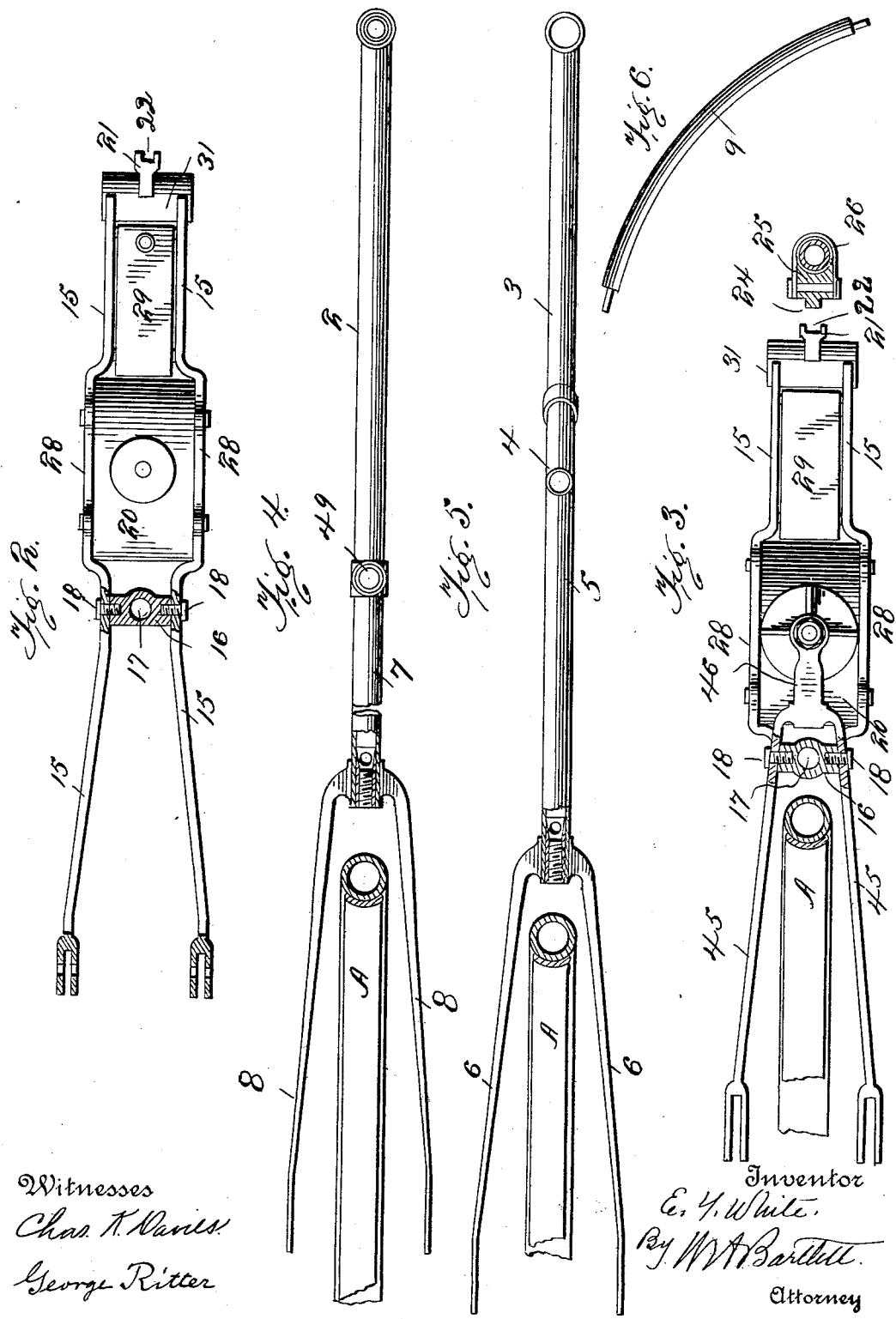

EDWARD Y. WHITE, OF SAN ANTONIO, TEXAS.

FRAME FOR MOTOR-BICYCLES.

SPECIFICATION forming part of Letters Patent No. 677,485, dated July 2, 1901.

Application filed January 12, 1901. Serial No. 43,050. (No model.)

*To all whom it may concern:*

Be it known that I, EDWARD Y. WHITE, residing at San Antonio, in the county of Bexar and State of Texas, have invented certain new and useful Improvements in Frames for Motor-Bicycles, of which the following is a specification, reference being had therein to the accompanying drawings.

This invention relates to frames for bicycle-motors.

The object of the invention is to produce a strong frame at low cost in which the motor shall be yieldingly supported and wherein by preference the rider may be sustained on an elastic support, so as to maintain a uniform relation with the pedal-shafts, and the movement of the engine properly guided.

Figure 1 is a broken side elevation showing the general arrangement of the parts constituting the frame, portions only of the wheels being shown, the frame being shown broken and the engine, attachments, and engine-frame being shown in elevation. Fig. 2 is a bottom plan, partly in section, of the auxiliary motor-frame and support. Fig. 3 is a top plan, partly sectioned, of the auxiliary or engine frame. Fig. 4 is a top plan of the frame-bars and upper rear fork, and Fig. 5 is a top plan of lower rear fork, both showing parts in section. Fig. 6 is a side elevation of curved brace 9.

The frame has a front standard or steering-post 1, in which the steering-head is swiveled. The front top bar 2 and lower bar 3 are rigidly connected to post 1 and are also rigid with the brace 4, which extends down from the top bar 2, is joined to bar 3, and then curved downwardly and rearwardly, as at 5, toward the rear or driving wheel. Near the rear wheel A the bar 4 5 forks and straddles the rear wheel, the bars 6 6 extending at the sides of the rear wheel A and supporting the rear hub-bearing. The rear top bar 7 is connected to the front part of the frame just in rear of brace or tie piece 4. The bar 7 forks near the rear wheel A and is joined by bars 8 8 and hub-bearings 10 to the side pieces 6 6. The bars 5 and 7 are connected at or just in front of their forks by a curved brace 9, which is rigid with the frame-pieces 5 and 7 and serves as a guide for the vertical movement of the auxiliary frame to be described, the curve of brace 9 being an arc around the pivot of said auxiliary frame. The hub-bearings 10, formed by the junction of the bars 6 8 at each side of the rear wheel, afford pivotal supports for the auxiliary or engine-supporting frame about to be described.

The auxiliary frame has a bottom member which has two side bars or forks 15, which are pivoted to the hub-bearings 10 and extend forward at each side of the wheel A. In front of the wheel A the bars 15 are braced by a cross-piece 16, which cross-piece has an opening 17, through which the curved brace 9 extends. The piece 16 is preferably held in position between the bars by the screws 18 passing through said bars and into the cross-piece. The bars 15, extending at the sides of the engine 20, have a guide-piece 21 attached at their front ends. This guide-piece 21 has a fork 22 at its forward end. The fork is made to be guided on the tongue 24 of the slideway 25, which slideway is clamped at the curve of tube 4 5, as by a clamping-piece 26. For strength and convenience the bars 15 are extended to form a cradle, as indicated at 28, this cradle being made to inclose the gasolene-tank 29, which tank may be of convenient form. The guide-piece 21 has bearings for the pedal-shaft 31. A sprocket-wheel 32 on this pedal-shaft connects by means of sprocket-chain 33 with a driving-sprocket on wheel A. A coaster-clutch of usual construction should be interposed between the pedals and the pedal motor-gear, so that the pedals may serve as a brake by back-pedaling, as is common.

A driving sprocket-wheel 35 on the engine connects to sprocket-wheel 37 on the hub or driving-wheel by means of sprocket-chain 36.

The auxiliary engine-frame is supported by a spring 40, secured to the main frame and supporting the auxiliary frame. The auxiliary frame is pivoted at 39 to the hub-support 10 and guided at the front against the slideway 25, which curves in the arc of a circle about pivot 39.

The auxiliary frame preferably has a top member, which is rigid with the bottom member and has side bars 45 projecting from the pivot 39 and joined together by a cross-piece 16, as in the lower frame member. The curved brace 9, passing through both crosspieces, serves to guide the rocking movement of the auxiliary frame, but permits such movement in a generally vertical direction. The front ends of bars 45 are joined to a bracket 46, which may be bolted or otherwise connected to the top of engine 20.

The saddle-post 48 is pivotally connected to guide-piece 21 and extends through an opening 49 in the top bar of the frame. This permits the saddle-post and pedals to partake of the same up-and-down movement, and the engine also moves vertically with the pedals and saddle on the auxiliary frame, but independently of the main frame in greater degree. The engine being interposed between the pedals and pivot of the auxiliary frame will have less amplitude of vertical movement, but will still have sufficient elasticity of support to relieve the main frame very greatly from sudden jars.

The front wheel B is connected to the front fork in any suitable way.

I have illustrated the bars 15 and 45 as flat; but it would be within ordinary mechanical skill to make them of other forms. So the slideway 25 may be secured in other manner than that illustrated, or another slide may be substituted. Modifications within the scope of my claims are contemplated.

What I claim is—

1. In a bicycle-frame, the upper and lower front bars connected to the steering-post, and connected to a brace which extends from the upper to the lower bar, and then curves downward and backward to a fork which extends beside the rear wheel and carries the rear-axle bearings, and a driving-motor supported on said brace between its upright portion and the rear wheel.

2. In a bicycle-frame, the steering-post, upper and lower front bars and a separate brace connecting them, upper and lower rear bars and a brace connecting them, and an auxiliary frame supporting a motor-engine between said front and rear braces, in combination.

3. The combination with the main bicycle-frame, of an auxiliary frame pivoted to the main frame, a spring-support for the free end of the auxiliary frame, and a motor-engine supported on the auxiliary frame.

4. The combination with the main frame of a bicycle, of an auxiliary frame yieldingly connected thereto, an engine attached to the auxiliary frame, a spring interposed between the main and auxiliary frames, and a guide-piece on the auxiliary frame in position to move along a slideway on the main frame, substantially as described.

5. The main frame of a bicycle having a substantially vertical guideway, an auxiliary frame pivoted to the main frame near one end, and guided on the slideway near the other end of the auxiliary frame, and means for holding the engine rigidly to the auxiliary frame.

6. The combination with the main frame of a bicycle having an upright brace, of a forked auxiliary frame pivoted to the main frame near the rear-hub bearing, and a curved brace connecting the upper and lower rear bars of the main frame, said brace passing through fixed pieces on the auxiliary frame and serving as a guide therefor, substantially as described.

7. The combination with the main frame of a bicycle, of an auxiliary frame pivoted to said main frame, said auxiliary frame having top and bottom members, an engine held to said top and bottom members of the auxiliary frame, and a spring supporting the auxiliary frame, substantially as described.

8. In a bicycle-frame, the combination of a hinged auxiliary frame, engine, and supporting-spring, of a basket on said auxiliary frame inclosing the engine, and a spring supporting the auxiliary frame.

9. In a bicycle, the combination with the main frame, of an auxiliary frame composed of top and bottom members connected by a hinge to the main frame, an engine interposed between said top and bottom members and secured to both, and a spring sustaining said auxiliary frame, substantially as described.

In testimony whereof I affix my signature in presence of two witnesses.

EDWARD Y. WHITE.

Witnesses:
EARL SCOTT,
R. P. INGRUM.